(12) United States Patent
Chan

(10) Patent No.: US 11,589,565 B1
(45) Date of Patent: Feb. 28, 2023

(54) CLACKING SWIMBAIT JOINT DEVICE

(71) Applicant: RIVER2SEA, LLC, Vacaville, CA (US)

(72) Inventor: Kwok Kong Chan, Vacaville, CA (US)

(73) Assignee: RIVER2SEA, LLC, Vacaville, CA (US)

( * ) Notice: Subject to any disclaimer, the term of this patent is extended or adjusted under 35 U.S.C. 154(b) by 193 days.

(21) Appl. No.: 16/853,438

(22) Filed: Apr. 20, 2020

(51) Int. Cl.
*A01K 85/01* (2006.01)
*A01K 85/18* (2006.01)

(52) U.S. Cl.
CPC .............. *A01K 85/01* (2013.01); *A01K 85/18* (2013.01)

(58) Field of Classification Search
CPC ...... A01K 85/01; A01K 85/017; A01K 85/18; A01K 85/1803; A01K 85/1863; A01K 85/1871; A01K 85/1881; A01K 85/16; A01K 85/00
USPC ............ 43/42.11, 42.15, 42.31, 42.47, 42.48
See application file for complete search history.

(56) References Cited

U.S. PATENT DOCUMENTS

| | | | | |
|---|---|---|---|---|
| 1,402,798 A * | 1/1922 | Ryan | A01K 85/18 43/42.15 |
| 1,557,644 A * | 10/1925 | Andersen | A01K 85/18 43/42.49 |
| 1,607,107 A * | 11/1926 | Weller | A01K 85/18 43/42.47 |
| 1,707,407 A * | 4/1929 | Miles | A01K 85/18 43/42.4 |
| 2,876,580 A * | 3/1959 | Schwartztrauber | A01K 85/18 43/42.31 |
| 3,077,698 A * | 2/1963 | Marvin | A63H 23/10 43/26.2 |
| 3,942,280 A * | 3/1976 | Ryder | A01K 85/18 43/42.22 |
| 4,188,743 A * | 2/1980 | Nothdurft | A01K 85/18 43/42.15 |
| 5,058,310 A * | 10/1991 | Andersen | A01K 85/18 43/42.15 |
| 5,201,784 A * | 4/1993 | McWilliams | A01K 85/01 43/42.31 |
| 5,887,377 A * | 3/1999 | Birko | A01K 85/02 43/37 |
| 5,946,848 A * | 9/1999 | Ysteboe | A01K 85/16 43/42.47 |
| 6,192,618 B1 * | 2/2001 | Wackerman | A01K 85/18 43/42.31 |
| 6,546,663 B1 * | 4/2003 | Signitzer | A01K 85/00 43/4.5 |
| 8,938,907 B2 * | 1/2015 | Meade | A01K 85/02 43/42.43 |
| 8,950,105 B2 * | 2/2015 | Thomas | A01K 85/01 43/42.31 |
| 9,433,196 B1 * | 9/2016 | Micelli | A01K 85/18 |
| 9,474,257 B1 * | 10/2016 | McGilvry | A01K 85/18 |

(Continued)

FOREIGN PATENT DOCUMENTS

JP        2018019641 A *  2/2018  ............ A01K 85/18

*Primary Examiner* — Brady W Frazier
(74) *Attorney, Agent, or Firm* — Richard T. Ogawa; Ogawa P.C.

(57) ABSTRACT

A fishing-lure device. More particularly, the invention provides a swim bait lure device having a barrel joint coupled between a head region and a tail region and configured to cause a plurality of clacking sounds as the device is pulled through a fluid.

12 Claims, 24 Drawing Sheets

(56) References Cited

U.S. PATENT DOCUMENTS

| | | | | |
|---|---|---|---|---|
| 2002/0189150 | A1* | 12/2002 | Thorne | A01K 85/18 43/42.15 |
| 2005/0102884 | A1* | 5/2005 | Kato | A01K 85/18 43/42.15 |
| 2006/0236588 | A1* | 10/2006 | Rapelje | A01K 85/16 43/42.24 |
| 2008/0104877 | A1* | 5/2008 | Claverie, III | A01K 85/00 43/42.09 |
| 2008/0202015 | A1* | 8/2008 | Langer | A01K 85/18 43/42.26 |
| 2010/0146837 | A1* | 6/2010 | Zernov | A01K 85/00 43/42.15 |
| 2011/0010984 | A1* | 1/2011 | Reynolds | A01K 85/01 43/42.22 |
| 2015/0128474 | A1* | 5/2015 | James | A01K 85/01 43/42.31 |
| 2016/0270380 | A1* | 9/2016 | Shirakawa | A01K 85/18 |
| 2019/0133099 | A1* | 5/2019 | Ostruszka | A01K 85/18 |
| 2019/0320634 | A1* | 10/2019 | Kawasaki | A01K 85/16 |

* cited by examiner

1:1
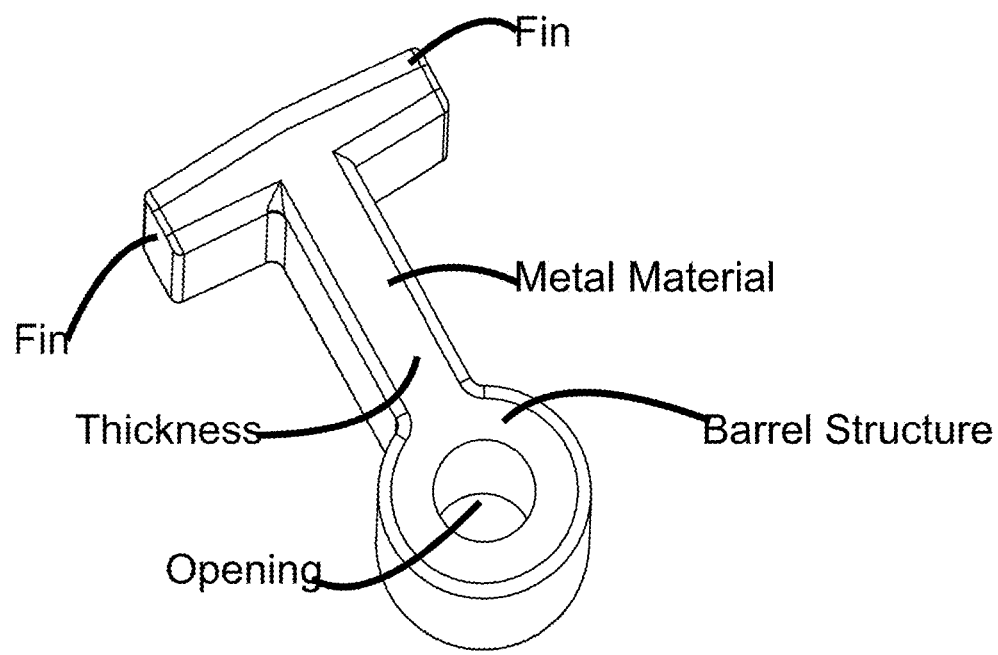
4:1
FIGURE 15

1:1
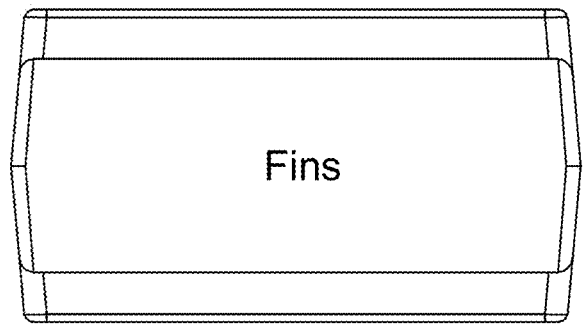
4:1
Figure 16

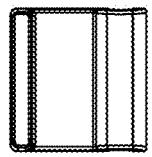
1: 1
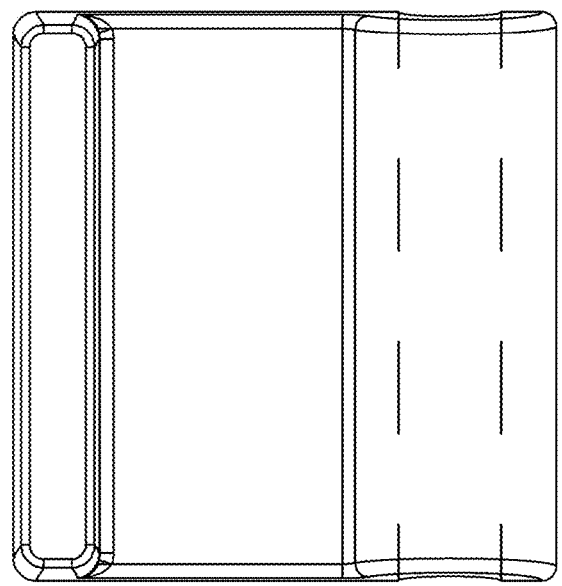
4: 1
FIGURE 17

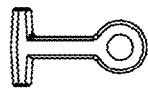
1: 1
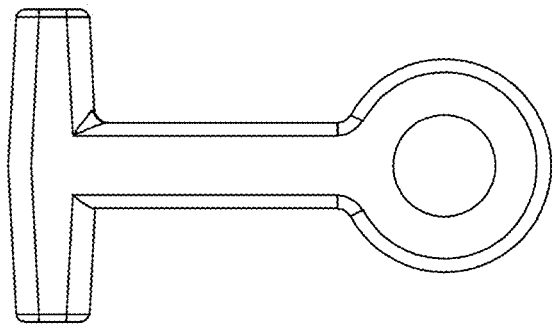
4: 1
FIGURE 18

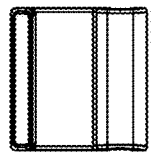
1:1
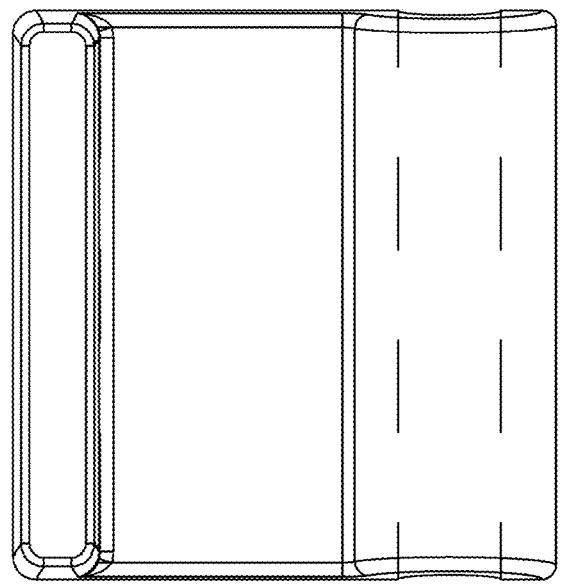
4:1
FIGURE 19

1: 1
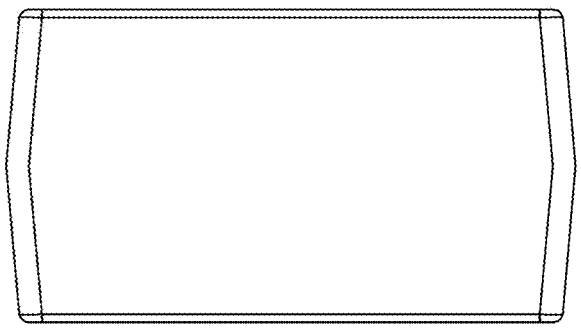
4: 1
FIGURE 20

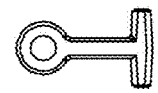
1: 1
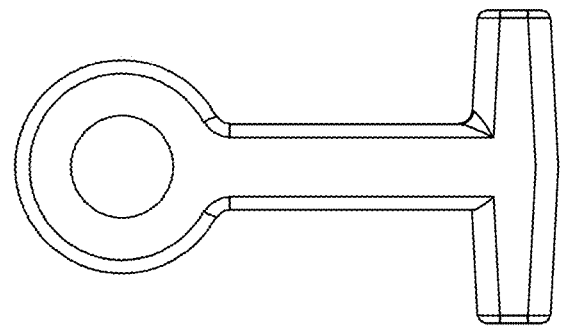
4: 1
FIGURE 21

R2S-Tactical Wake 210

CLACKING SWIMBAIT JOINT DEVICE

BACKGROUND OF INVENTION

The present invention relates generally to fishing techniques and in particular to fishing lures. More particularly, the invention provides a swim bait lure device having a barrel joint coupled between a head region and a tail region and configured to cause a plurality of clacking sounds as the device is pulled through a fluid. Merely by way of example, the invention has been applied to a swim bait, but it would be recognized that other applications exist.

One of the greatest sporting activities known to mankind is fishing. Human beings involved in the activity of fishing are often called "fisherman" or "fisherwoman." Fishing often involves using a bait, whether natural or artificial, which is attached to one or more hooks that are tied to a line from a fishing rod and reel. The bait is introduced into a lake, stream, or ocean to attract and lure a fish to strike it. Once the fish strikes, sharp hooks often hidden by the bait pierce into the tissue of the fish. Often times, the fish becomes hooked in the mouth. After a struggle between the fisherman and the fish, one of them wins. Either the fisherman happily lands the fish or the fish breaks itself from the hook and swims away. At one time, fishing was performed predominantly for survival purposes to catch and eat as food and enjoy for a meal. More recently, fishermen now participate in the act of fishing purely for the "sport" of catching the fish, which is often released back into the water after it has been caught. Sport fishermen often use artificial baits to entice and catch the fish.

In sport fishing, an artificial bait is often called a lure, which is an object attached to the end of the fishing line. The artificial bait is often designed to resemble and move like an item of fish prey. Often times, the lure is equipped with one or more hooks that hold the fish attracted to the lure. Lures can be made using hard plastic, soft plastics, metal, wood, and any of their combinations. A wide variety of colors can also be used on the lures.

Many types of fishing lures exist. Lures often imitate smaller bait fish, snakes, ducks, crawfish, worms, and other small animals capable of attracting a larger predatory fish. An example of a fishing lure for large predatory fish such as black bass is a buzz bait or spinner bait. All of these baits can be fished on the surface, and can sink quickly. These baits, however, have difficulty and a slow retrieve since they sink quickly.

From the above, it is seen that improved techniques for lure designs are highly desired.

BRIEF SUMMARY OF THE INVENTION

The present invention relates generally to fishing techniques and in particular to fishing lures. More particularly, the invention provides a swim bait lure device having a barrel joint coupled between a head region and a tail region and configured to cause a plurality of clacking sounds as the device is pulled through a fluid. Merely by way of example, the invention has been applied to a swim bait, but it would be recognized that other applications exist.

In an example, the present invention provides a fishing-lure device. More particularly, the invention provides a swim bait lure device having a barrel joint coupled between a head region and a tail region and configured to cause a plurality of clacking sounds as the device is pulled through a fluid. In an example, the clacking sound can be heard from a user of the lure device and can be felt from the fishing rod when pulling the device through the water.

One or more benefits can be achieved using the present invention over conventional techniques. The present invention can be made using conventional materials and components according to a specific embodiment. Additionally, the invention can be applied to a swim bait and other like lures. In a preferred embodiment, the present invention provides a floating, suspending, or sinking lure to simulate a swimming action and a clacking sound. These and other benefits have been described throughout the present specification and more particularly below.

Various additional objects, features and advantages of the present invention can be more fully appreciated with reference to the detailed description and accompanying drawings that follow.

BRIEF DESCRIPTION OF DRAWINGS

FIG. 15 is top-view perspective diagram of a lure device according to an example of the present invention.

FIG. 16 is a back-view diagram of a lure device according to an example of the present invention.

FIG. 17 is a side-view diagram of a lure device according to an example of the present invention.

FIG. 18 is a top-view diagram of a lure device according to an example of the present invention.

FIG. 19 is a side-view diagram of a lure device according to an example of the present invention.

FIG. 20 is a front-view diagram of a lure device according to an example of the present invention.

FIG. 21 is a bottom-view diagram of a lure device according to an example of the present invention.

DETAILED DESCRIPTION OF THE EXAMPLES

Figure 1:
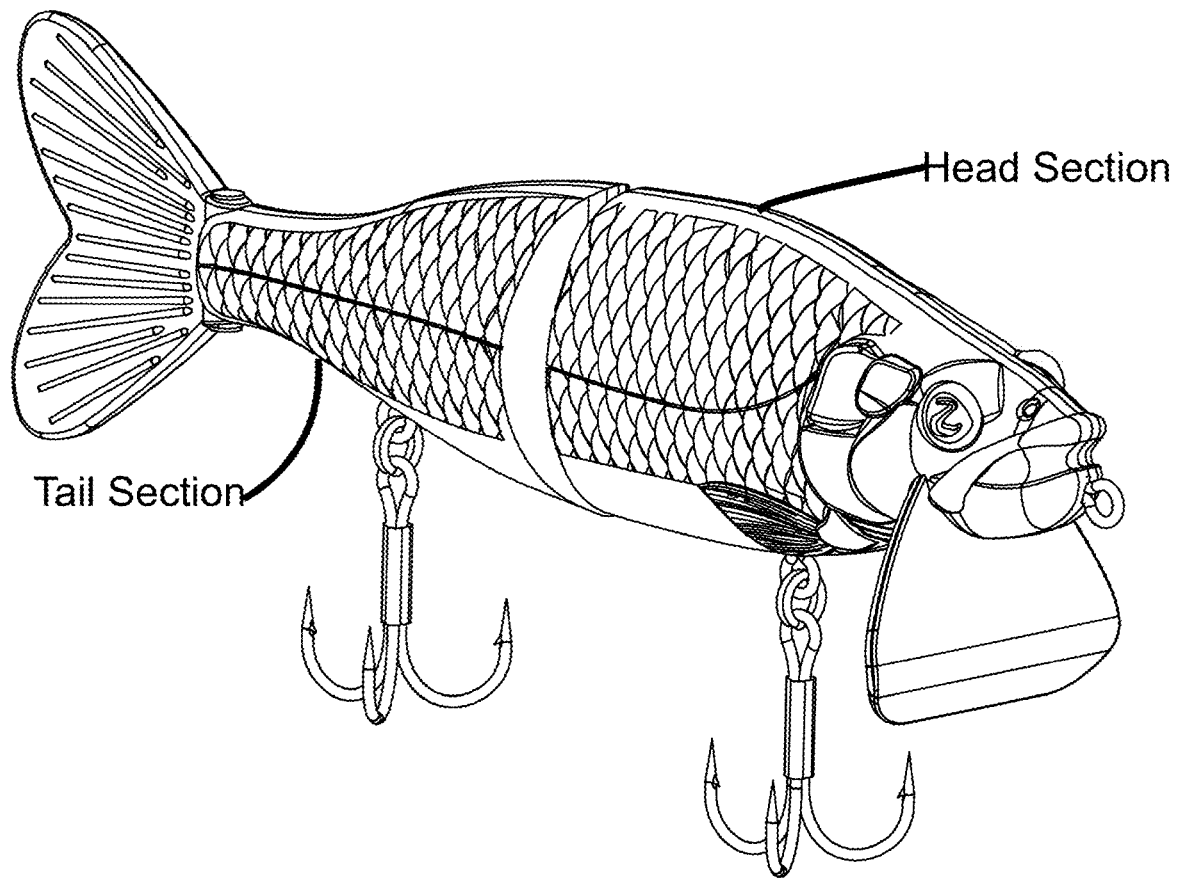
FIG. 1 is a front-view perspective diagram of a lure device according to an example of the present invention.

The present invention relates generally to fishing techniques and in particular to fishing lures. More particularly, the invention provides a floating spinner bait lure and method, which can act as a spinner bait or buzz bait or popper, or even stop and float like a live bait, according to a specific embodiment. Merely by way of example, the invention has been applied to a wired spinner bait or buzz bait or popper lure, but it would be recognized that other applications exist.

In an example, the present invention provides a fishing lure device. The device has a head section extending from a first center region. In an example, the first center region has a first internal region including a first slot on a first side and a second slot on a second side of the first internal region.

In an example, the device has a tail section extending to a second center region. In an example, the second center region is configured with a pin having a first end and a second end. In an example, the first end and the second end each of which is coupled to a second internal region of the second center region and the pin aligned normal to a direction of a length of the tail section, while attached by the first end and the second end.

In an example, the device has a barrel hinge configured between the first center region and the second center region. In an example, the barrel hinge comprises a metal member having a metal thickness, a metal width, and a metal length. In an example, the metal length has a first end and a second end. The hinge has a pair of fins, each extending outwardly on the first end. In an example, the pair of fins comprises a first fin engaged with the first slot and the second fin engaged with the second slot to attach the head section. The hinge has a barrel structure configured with the pin to attach the tail section and configured to allow the tail section to pivot about the pin and cause the tail section to move relative to the head section to imitate a swimming action.

In an example, each of the head section and the tail section is made of a polymeric material. In an example, the head section comprises a first head section side and a second head section side coupled together to form the head section as a first single structure. In an example, the tail section comprises a first tail section side and a second tail section side coupled together to form the tail section as a second single structure.

In an example, the first center region comprises an exterior cavity region configured in a first angle and the second center region comprises an exterior apex region configured in a second angle. In an example, the second angle is less than the first angle to allow the tail section to pivot about the pin and swing in a first direction until a first portion of the exterior apex region hits a first portion of the exterior cavity region and then swing in a second direction until a second portion of the exterior apex region hits a second portion of the exterior cavity region when the lure device is pulled through a fluid.

In an example, the first center region comprises an exterior cavity region configured in a first angle and the second center region comprises an exterior apex region configured in a second angle. In an example, the second angle is less than the first angle to allow the tail section to pivot about the pin and swing in a first direction until a first portion of the exterior apex region hits a first portion of the exterior cavity region such that the hit causes a first clacking sound and then swing in a second direction until a second portion of the exterior apex region hits a second portion of the exterior cavity region such that the hits causes a second clacking sound when the lure device is pulled through a fluid.

In an example, the pin is made of a metal material having sufficient strength to hold the tail section to the head section. In an example, each fin is normal a plane of the metal length, and each fin is normal to the direction of the length of the tail section. In an example, the metal member is a single piece of metal material. In an example, the metal member is configured from a pair of metal sides coupled together to form the metal member. In an example, each of the head section and the tail section are made of a polymeric material having a density sufficient to allow the head section and the tail section to sink and suspend in a fluid.

In an example, the first center region comprises an exterior cavity region configured in a first angle and the second center region comprises an exterior apex region configured in a second angle. In an example, the second angle is less than the first angle to allow the tail section to pivot about the pin and swing in a first direction until a first portion of the exterior apex region hits a first portion of the exterior cavity region such that the hit causes a first clacking sound and then swing in a second direction until a second portion of the exterior apex region hits a second portion of the exterior cavity region such that the hits causes a second clacking sound when the lure device is pulled through a fluid; and wherein the swimming action causes a plurality of clacking sounds as the tail section pivots about the head section.

Further details of the present invention can be found throughout the present specification and more particularly below.

FIG. 1 is a front-view perspective diagram of a lure device according to an example of the present invention. In an example, the present invention provides a fishing lure device, which can be swim bait or gliding bait. The device is multiple pieces, and has a head section extending from a first center region, which is near a middle section of the device. In an example, the first center region has a first internal region including a first slot on a first side and a second slot on a second side of the first internal region. Each of the slots is configured to allow a barrel hinge to be configured between the slots, as will be described.

In an example, the device has a tail section extending to a second center region, which is near a center region of the device. In an example, the second center region is configured with a pin having a first end and a second end. In an example, the first end and the second end each of which is coupled to a second internal region of the second center region and the pin aligned normal to a direction of a length of the tail section, while attached by the first end and the second end. Each end of the pin is secured using a coupling region, which firmly engages and mates the end of the pin, while allowing a center region to be exposed to allow the opening of the barrel to be inserted into the pin to allow the head section and tail section to pivot about the pin.

In an example, the device has a barrel hinge configured between the first center region and the second center region. In an example, the barrel hinge comprises a metal member having a metal thickness, a metal width, and a metal length. In an example, the metal length has a first end and a second end. In an example, the metal length is along a direction of the lure device. The metal width is along a width of the lure device, and the metal thickness is along a thickness of the lure device.

In an example, the hinge has a pair of fins, each extending outwardly on the first end as shown. In an example, the pair of fins comprises a first fin engaged with the first slot and the second fin engaged with the second slot to attach the head section. The hinge has a barrel structure configured with the pin to attach the tail section and configured to allow the tail section to pivot about the pin and cause the tail section to move relative to the head section to imitate a swimming action. Further details of the present invention can be found through out the present specification and more particularly below.

Figure 2:
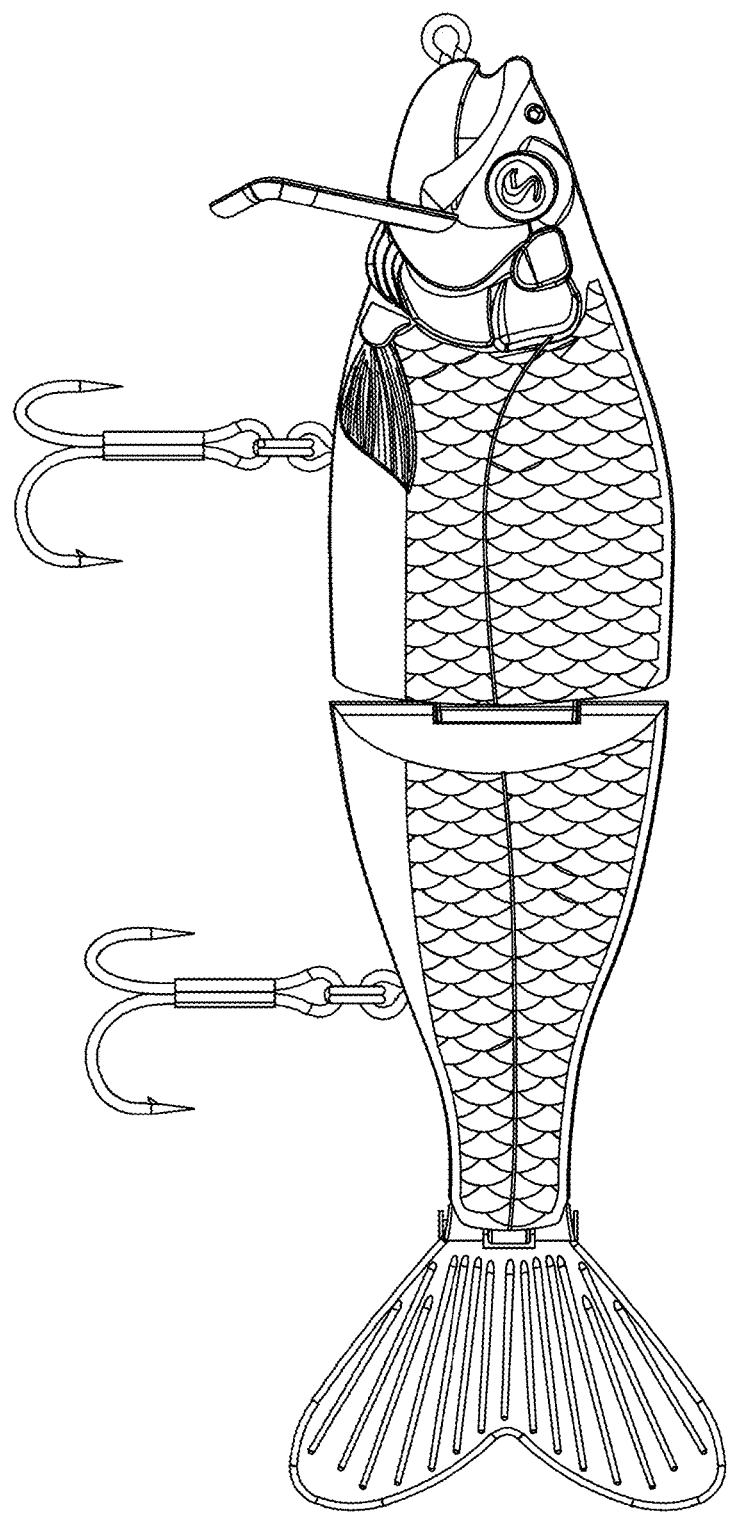
FIG. 2 is a side-view diagram of a lure device according to an example of the present invention.
Figure 3:
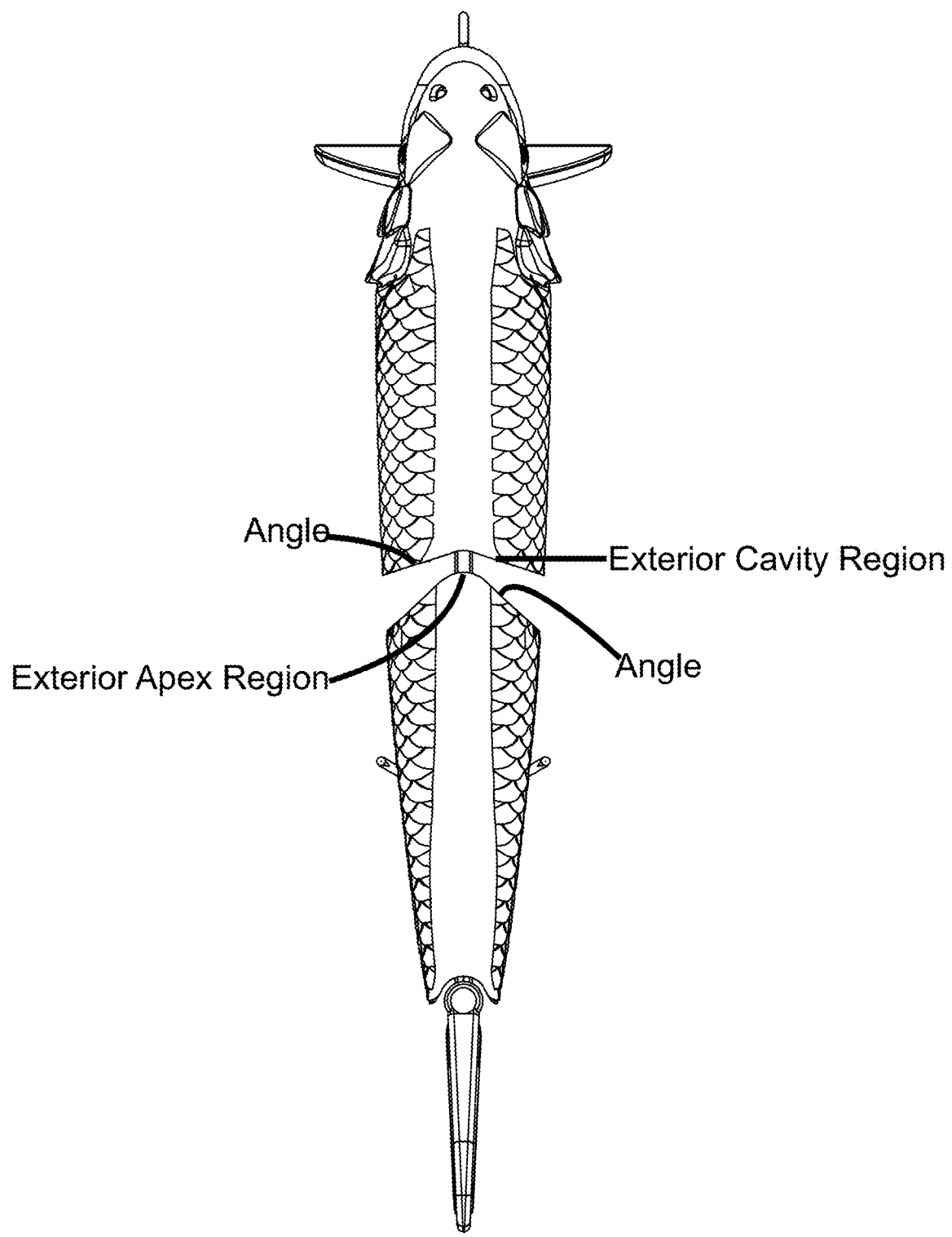
FIG. 3 is a top-view diagram of a lure device according to an example of the present invention.
Figure 4:
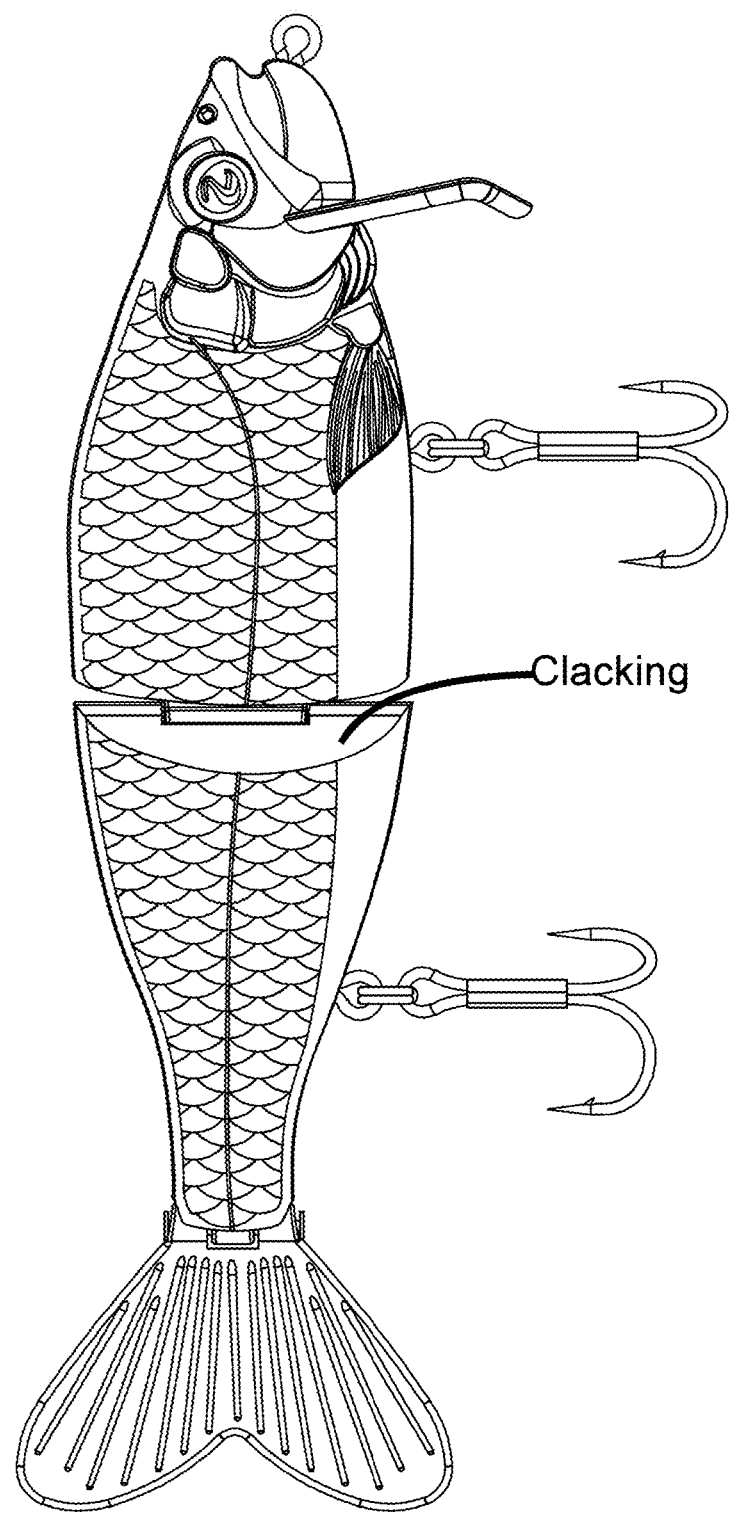
FIG. 4 is a side-view diagram of a lure device according to an example of the present invention.
Figure 5:
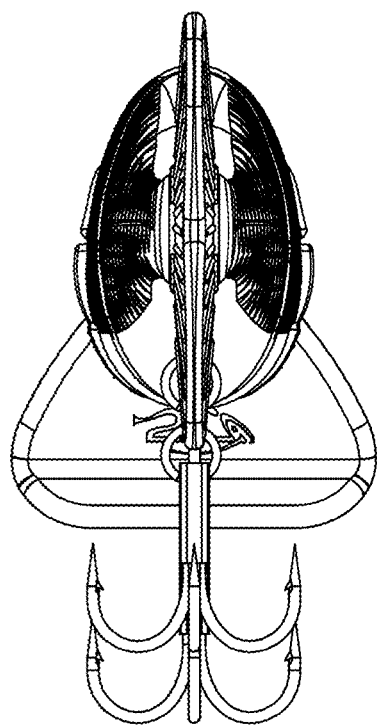
FIG. 5 is a back-view diagram of a lure device according to an example of the present invention.
Figure 6:
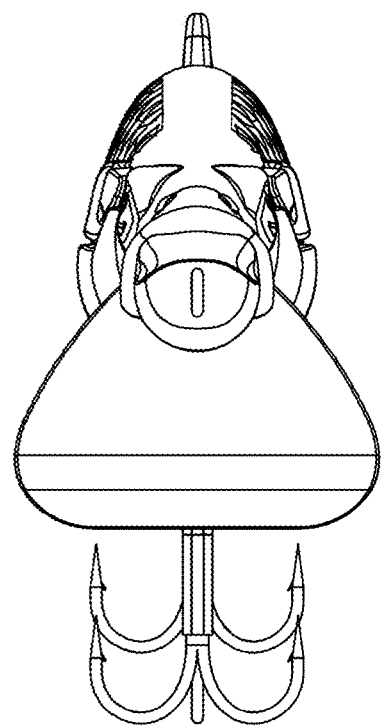
FIG. 6 is a front-view diagram of a lure device according to an example of the present invention.
Figure 7:
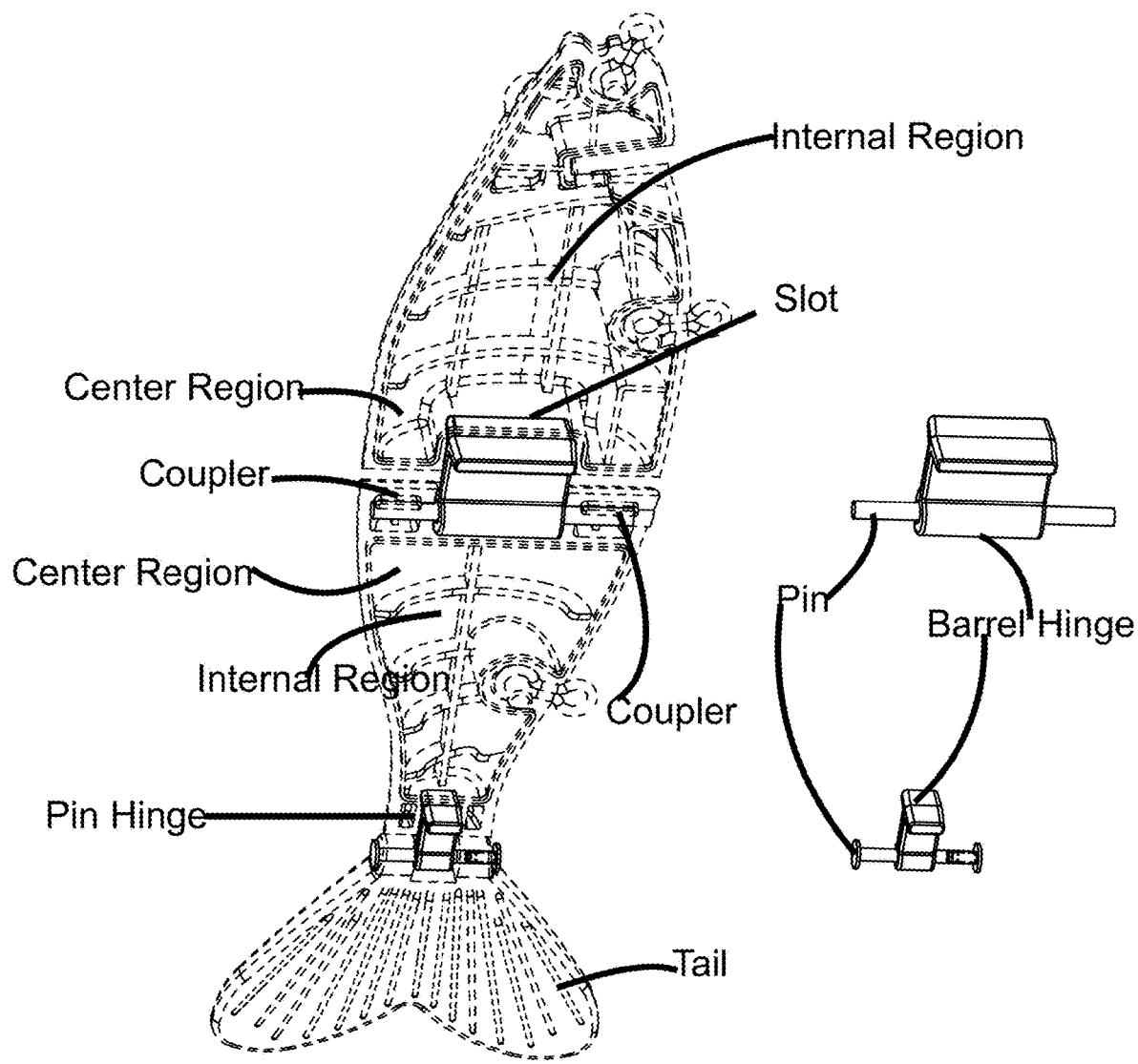
FIG. 7 is a front-view perspective diagram of a lure device according to an example of the present invention.
Figure 8:
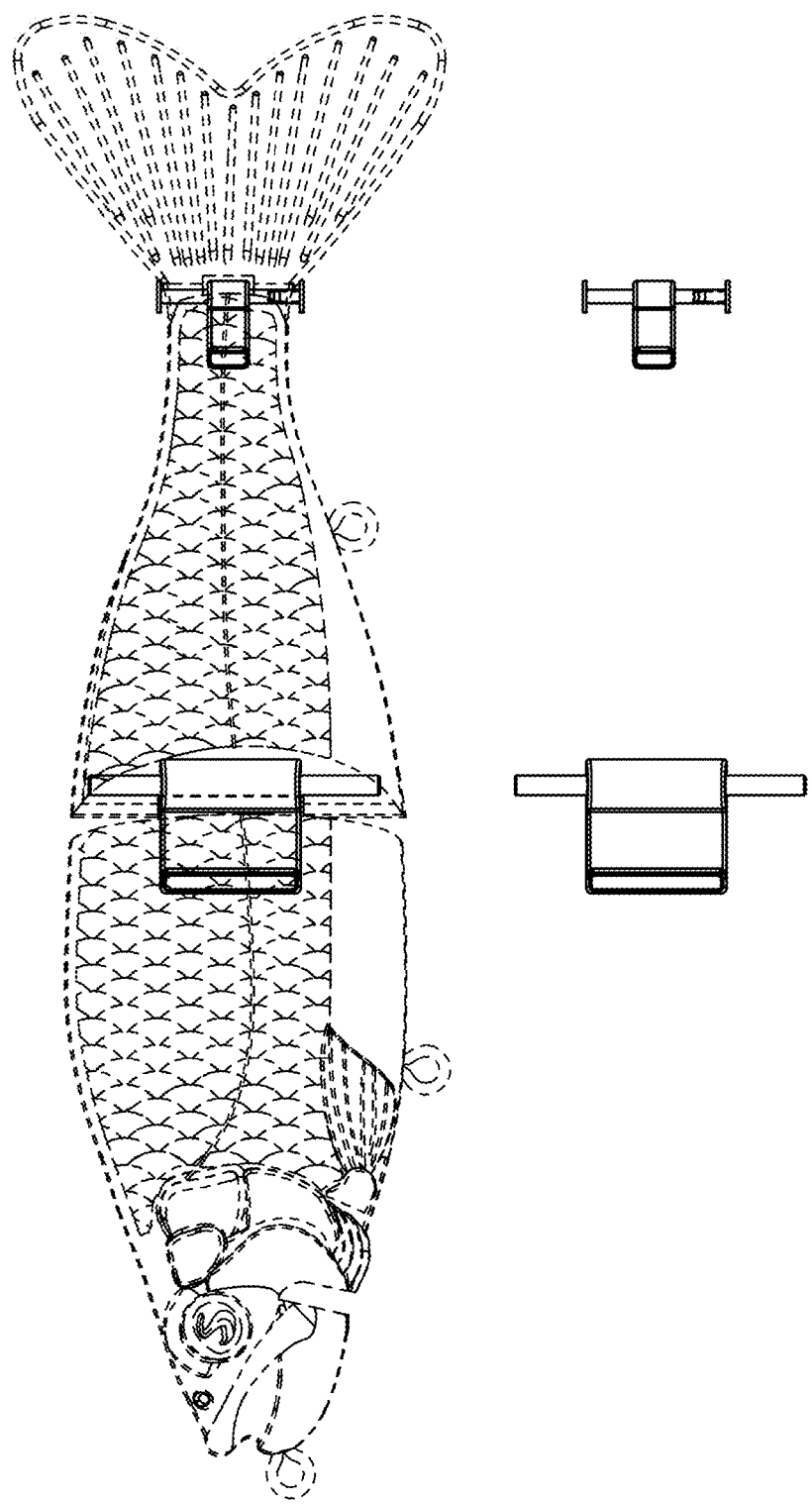
FIG. 8 is a side-view diagram of a lure device according to an example of the present invention.
Figure 9:
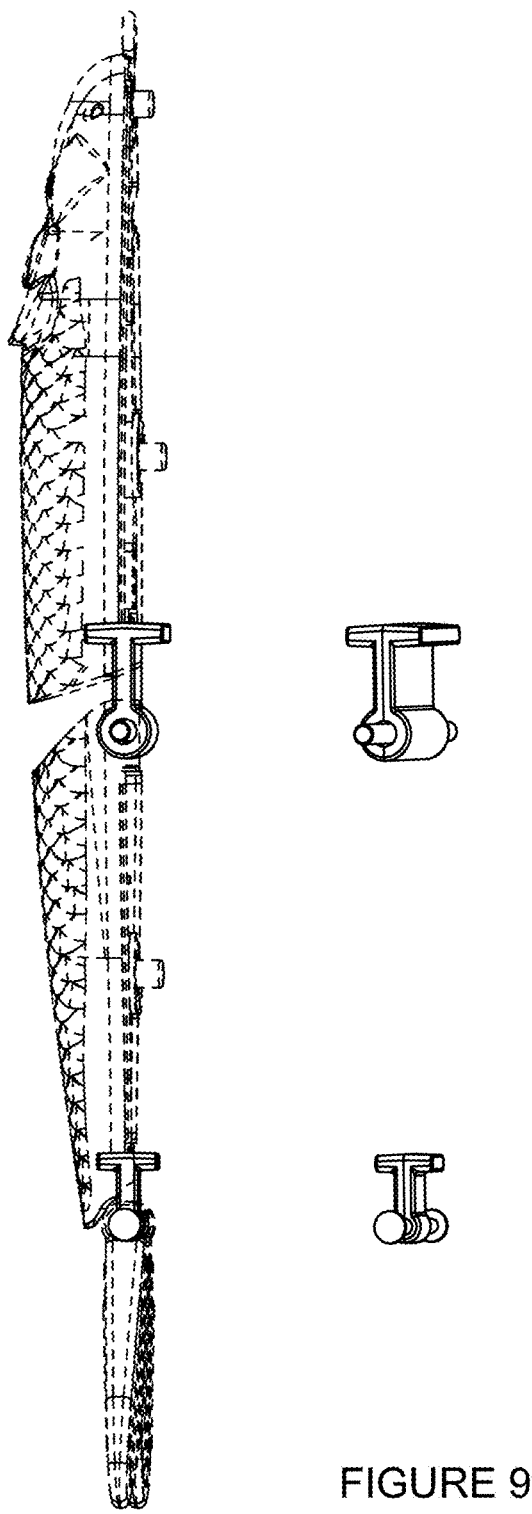
FIG. 9 is a top-view diagram of a lure device according to an example of the present invention.
Figure 10:
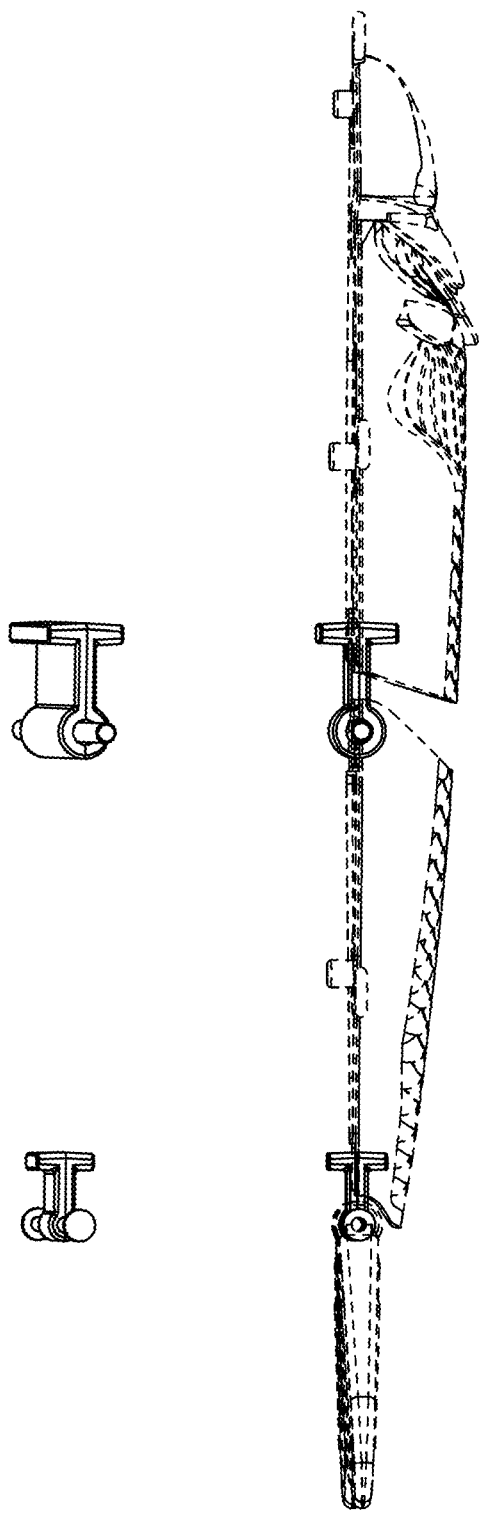
FIG. 10 is a bottom-view diagram of a lure device according to an example of the present invention.
Figure 11:
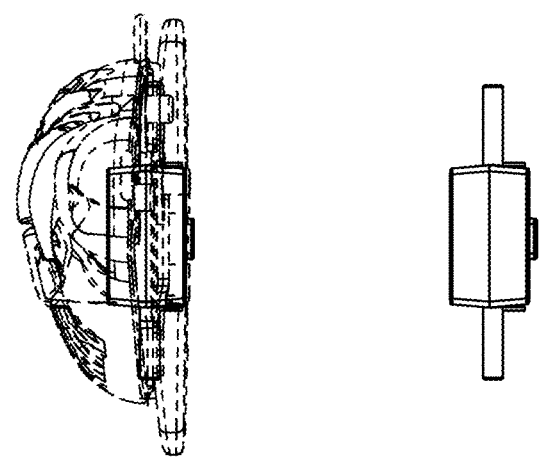
FIG. 11 is a front-view diagram of a lure device according to an example of the present invention.
Figure 12:
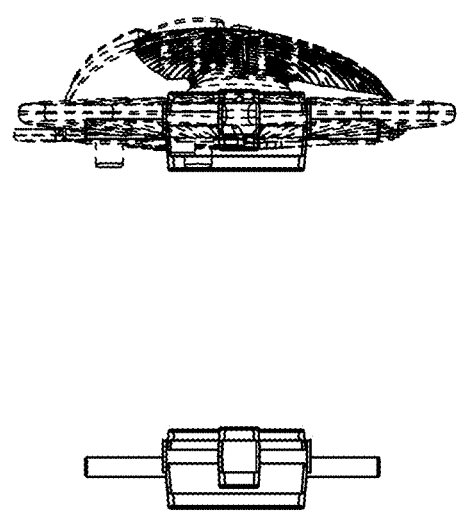
FIG. 12 is front view diagram of a lure device according to an example of the present invention.
Figure 13:
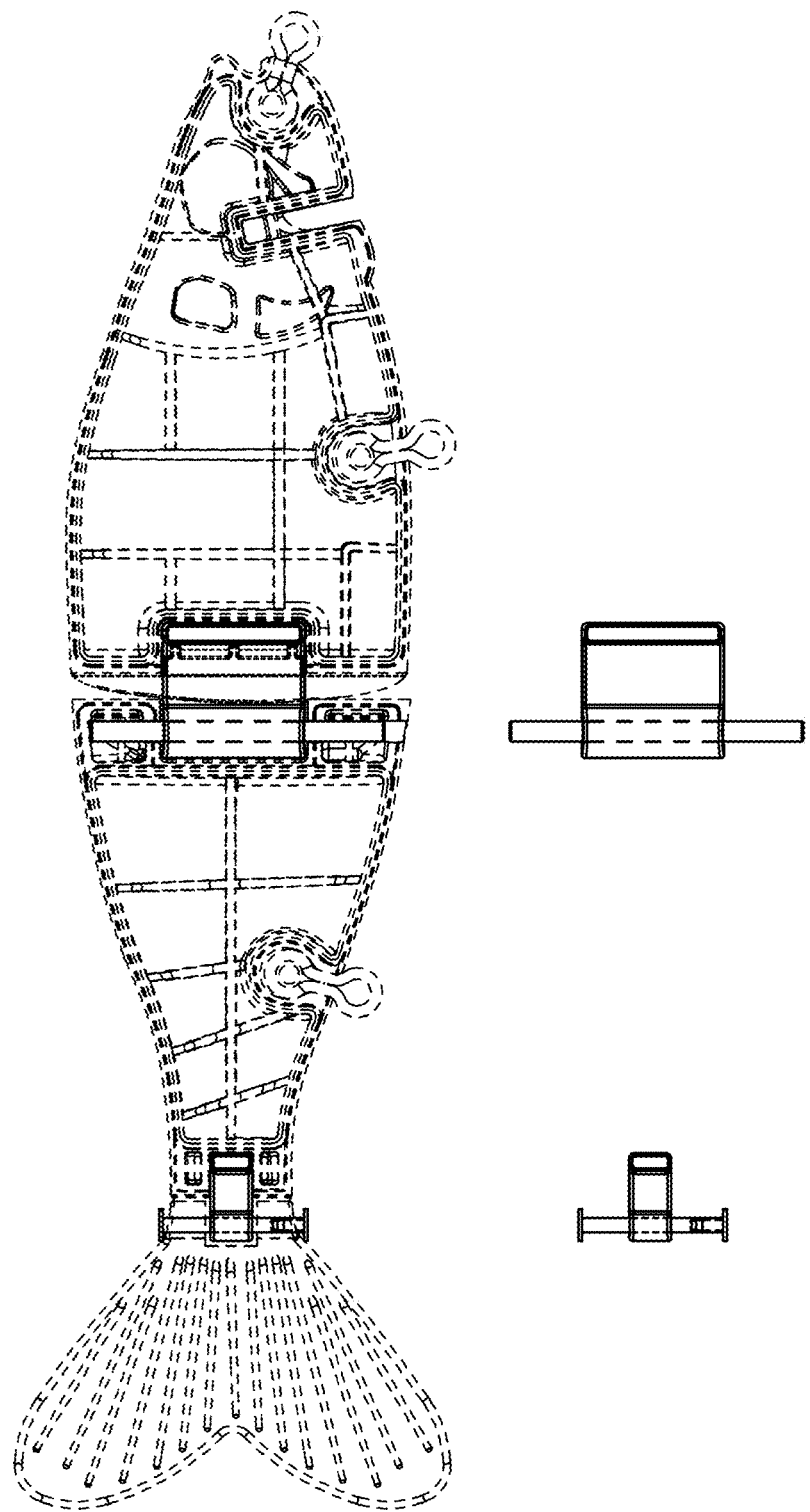
FIG. 13 is a side-view diagram of a lure device according to an example of the present invention.
Figure 14:
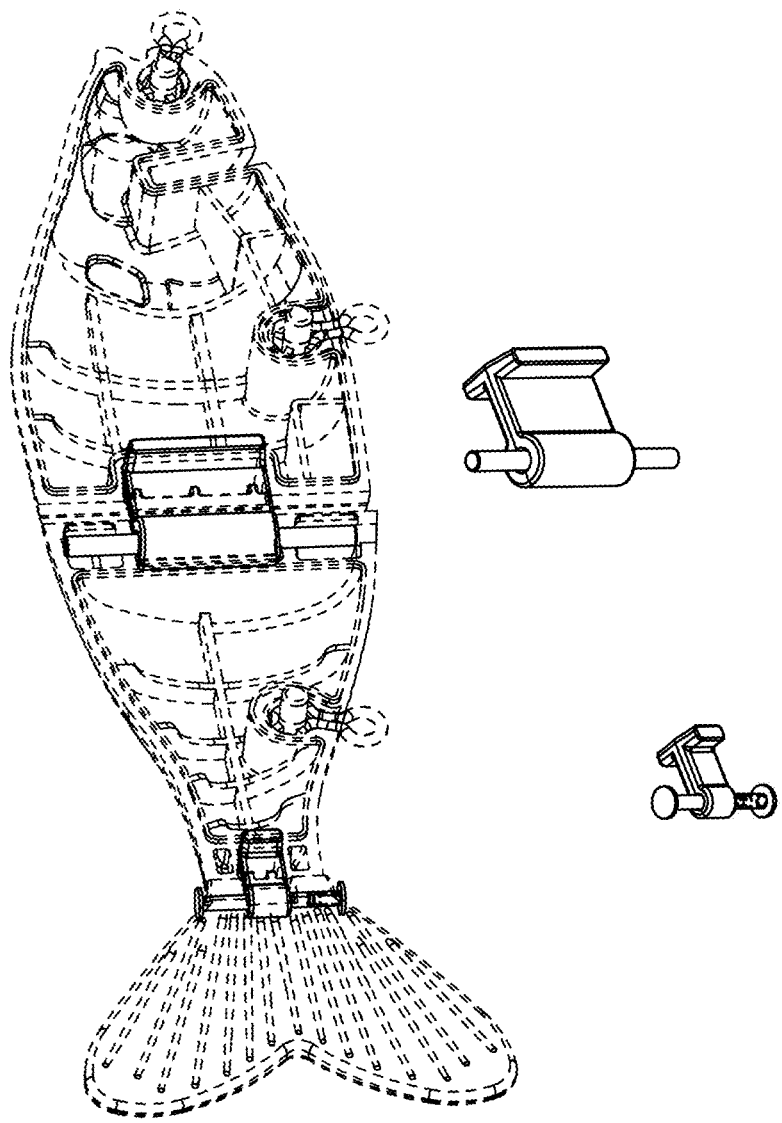
FIG. 14 is a back-view perspective diagram of a lure device according to an example of the present invention.

FIG. 2 is a side-view diagram of a lure device according to an example of the present invention. FIG. 3 is a top-view diagram of a lure device according to an example of the present invention. FIG. 4 is a side-view diagram of a lure device according to an example of the present invention. FIG. 5 is a back-view diagram of a lure device according to an example of the present invention. FIG. 6 is a front-view diagram of a lure device according to an example of the present invention. FIG. 7 is a front-view perspective diagram of a lure device according to an example of the present invention. FIG. 8 is a side-view diagram of a lure device according to an example of the present invention. FIG. 9 is a top-view diagram of a lure device according to an example of the present invention. FIG. 10 is a bottom-view diagram of a lure device according to an example of the present invention. FIG. 11 is a front-view diagram of a lure device according to an example of the present invention. FIG. 12 is front view diagram of a lure device according to an example of the present invention. FIG. 13 is a side-view diagram of a lure device according to an example of the present invention. FIG. 14 is a back-view perspective diagram of a lure device according to an example of the present invention. FIG. 15 is top-view perspective diagram of a lure device according to an example of the present invention. FIG. 16 is a back-view diagram of a lure device according to an example of the present invention. FIG. 17 is a side-view diagram of a lure device according to an example of the present invention. FIG. 18 is a top-view diagram of a lure device according to an example of the present invention. FIG. 19 is a side-view diagram of a lure device according to an example of the present invention. FIG. 20 is a front-view diagram of a lure device according to an example of the present invention.

FIG. 21 is a bottom-view diagram of a lure device according to an example of the present invention.

Of course, there can be other variations, modifications, and alternatives.

In an example, the first center region comprises an exterior cavity region configured in a first angle and the second center region comprises an exterior apex region configured in a second angle. In an example, the second angle is less than the first angle to allow the tail section to pivot about the pin and swing in a first direction until a first portion of the exterior apex region hits a first portion of the exterior cavity region such that the hit causes a first clacking sound and then swing in a second direction until a second portion of the exterior apex region hits a second portion of the exterior cavity region such that the hits causes a second clacking sound when the lure device is pulled through a fluid. The lure device further comprises a spatial gap between the exterior apex region and an inflection region of the exterior cavity region. The spatial gap can be about 1 mm or greater, or less, but allows the exterior apex tip to be separate from the inflection region regardless of the position of the tail region to the head region or separates the exterior apex tip from the inflection region of the exterior cavity region through all angles between the tail region and the head region about the pin. Of course, there can be other variations, modifications, and alternatives.

In an example, the present invention provides a fishing lure device. The device has a head section extending from a first center region. In an example, the first center region having a first internal region including a first slot on a first side and a second slot on a second side of the first internal region. In an example, the device has a tail section extending region to a second center region. In an example, the second center region is configured with a pin having a first end and a second end. In an example, the first end and the second end is coupled to a second internal region of the second center region and the pin aligned normal to a direction of a length of the tail section, while attached by the first end and the second end.

In an example, the device has a barrel hinge configured between the first center region and the second center region. In an example the barrel hinge comprises a metal member having a metal thickness, a metal width, and a metal length. In an example, the metal length has a first end and a second end and made of a suitable material that is resistant to corrosion and is able to allow for movement about the pin. The material can be an aluminum or stainless-steel alloy that is corrosion resistant and has sufficient strength to allow the device to be thrown on hard surfaces, rocks, and other objects without breaking. In an example, the hinge has a pair of fins, each extending outwardly on the first end, the pair of fins comprising a first fin engaged with the first slot and the second fin engaged with the second slot to attach the head section. The hinge has a barrel structure configured with the pin to attach the tail section and configured to allow the tail section to pivot about the pin and cause the tail section to move relative to the head section to imitate a swimming action. The barrel structure has a length and opening. In an example, the first center region comprises an exterior cavity region configured in a first angle and the second center region comprises an exterior apex region configured in a second angle. In an example the second angle is less than the first angle to allow the tail section to pivot about the pin and swing in a first direction until a first portion of the exterior apex region hits a first portion of the exterior cavity region such that the hit causes a first clacking sound and then swing in a second direction until a second portion of the exterior apex region hits a second portion of the exterior cavity region such that the hits causes a second clacking sound when the lure device is pulled through a fluid.

In an example, each of the head section and the tail section is made of a polymeric material. The polymeric material can be a hard plastic, which floats, or sinks slightly, or sinks rapidly. In an example, the polymeric material can be injection molded or gravity molded or printed or carved using rapid prototyping tools and the like.

In an example, the head section comprises a first head section side and a second head section side coupled together to form the head section as a first single structure. In an example, the tail section comprises a first tail section side and a second tail section side coupled together to form the tail section as a second single structure.

In an example, the tail section comprises a tail barrel joint coupled between a tail member and a mid-tail section such that the tail member pivots about the tail barrel joint to imitate a tail fluttering action as the device is pulled through the fluid.

In an example, the pin is made of a metal material has sufficient strength to hold the tail section to the head section. In an example, the pin is made of a suitable material that is resistant to corrosion and is able to allow for movement about the pin. The material can be an aluminum or stainless-steel alloy that is corrosion resistant and has sufficient strength to allow the device to be thrown on hard surfaces, rocks, and other objects without breaking. Preferably, the pin is a high quality stainless steel material or the like.

In an example, each fin is normal a plane of the metal length, and each fin is normal to the direction of the length of the tail section.

In an example, the metal member is a single piece of metal material.

In an example, the metal member is configured from a pair of metal sides coupled together to form the metal member.

In an example, each of the head section and the tail section are made of a polymeric material having a density sufficient to allow the head section and the tail section to sink and suspend in a fluid. In an example, the polymeric material is an Acrylonitrile butadiene styrene (ABS) plastic, which is hard and durable.

In an example, the pin is made of a rust-free alloy. In an example, the alloy is a stainless steel. In an example, the rear pin is made of an aluminum material. In an example, the barrel hinge is made of stainless steel or other high quality material. In an example, the width of the hinge is 50-90% of the width of the lure device but can be others.

In an example, the tail section pivots about the head section in an angle ranging from about 20 Degrees to about 10 Degrees, and is preferably about 16 Degrees, but can be larger or smaller. In an example, the tail section has an apex that is about 60 to 70 Degrees from surface to surface and is preferably about 62 Degrees. In an example, the head section has a v shaped region that has an angle of about 70 to 85 Degrees from surface to surface and is preferably about 78 Degrees.

In an example, the tip of the tail region and the lowest indent of the v shaped region of the tail has a gap ranging from 2 mm to 5 mm and is preferably about 3 mm to 4 mm. In an example, a length of an entirety of the lure device is about 210 mm but can be slightly larger or smaller in an example. In an example, the gap is large enough so that the tip of the tail region, which mates with the lowest indent or trough of the v-shaped region, are not in contact with each other while the device is in a swimming motion.

In an example, the tail region pivots about the head region, and mimics a swimming action while the tail itself, pivots about a joint to form an additional swimming action. Further details of the swimming action can be found throughout the present specification and more particularly below.

In an example, the invention provides a fishing lure device. The fishing lure device has a head section (See, for example, "A" in the Figures below) extending from a first center region. In an example, the first center region has a first internal region including a first slot on a first side and a second slot on a second side of the first internal region. In an example, the device has a tail section (See, for example, "B" in the Figures below) extending to a second center region. In an example, the second center region is configured with a pin having a first end and a second end. In an example, the first end and the second end are coupled to a second internal region of the second center region and the pin aligned normal to a direction of a length of the tail section, while attached by the first end and the second end.

In an example the device has a barrel hinge configured between the first center region and the second center region. In an example, the barrel hinge comprises a metal member having a metal thickness, a metal width, and a metal length, the metal length having a first end and a second end. The metal material can be any suitable corrosion resistant material, such as a zinc alloy, stainless steel, nickel alloy, or others. In an example, the hinge has a pair of fins, each of which is extending outwardly on the first end. In an example, the pair of fins comprises a first fin engaged with the first slot and the second fin engaged with the second slot to attach the head section. In an example, the hinge has a barrel structure configured with the pin to attach the tail section and configured to allow the tail section to pivot about the pin and cause the tail section to move relative to the head section to imitate a swimming action.

In an example, the first center region comprises an exterior cavity region configured in a first angle and the second center region comprises an exterior apex region configured in a second angle. In an example, the second angle is less than the first angle to allow the tail section to pivot about the pin and swing in a first direction up to an angle of 38 Degrees about a center line until a first portion of the exterior apex region hits a first portion of the exterior cavity region such that the hit causes a first clacking sound and then swing in a second direction up to an angle of 38 Degrees about the center line until a second portion of the exterior apex region hits a second portion of the exterior cavity region such that the hits causes a second clacking sound when the lure device is pulled through a fluid. The angle can be slightly more or less depending upon the example.

Figure 22:
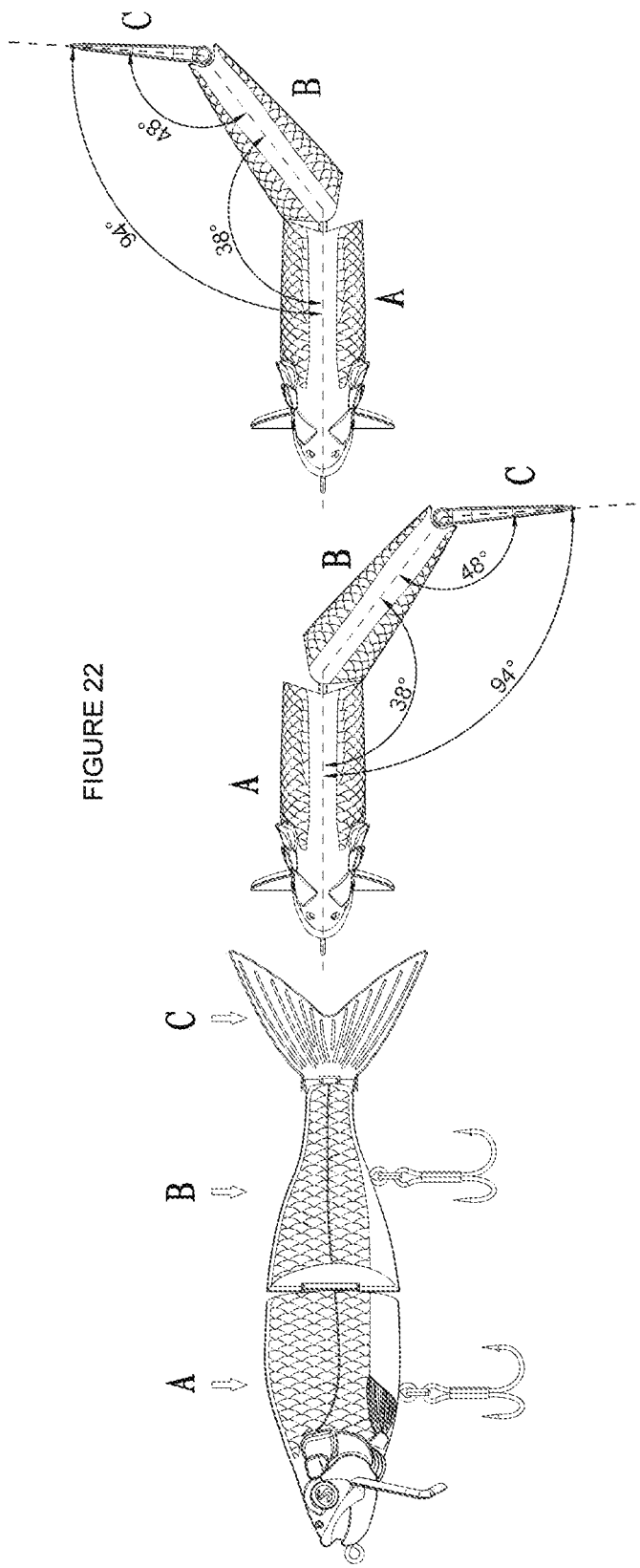
FIG. 22 is a simplified diagram illustrating a swimming motion of the device according to an example.
Figure 23:
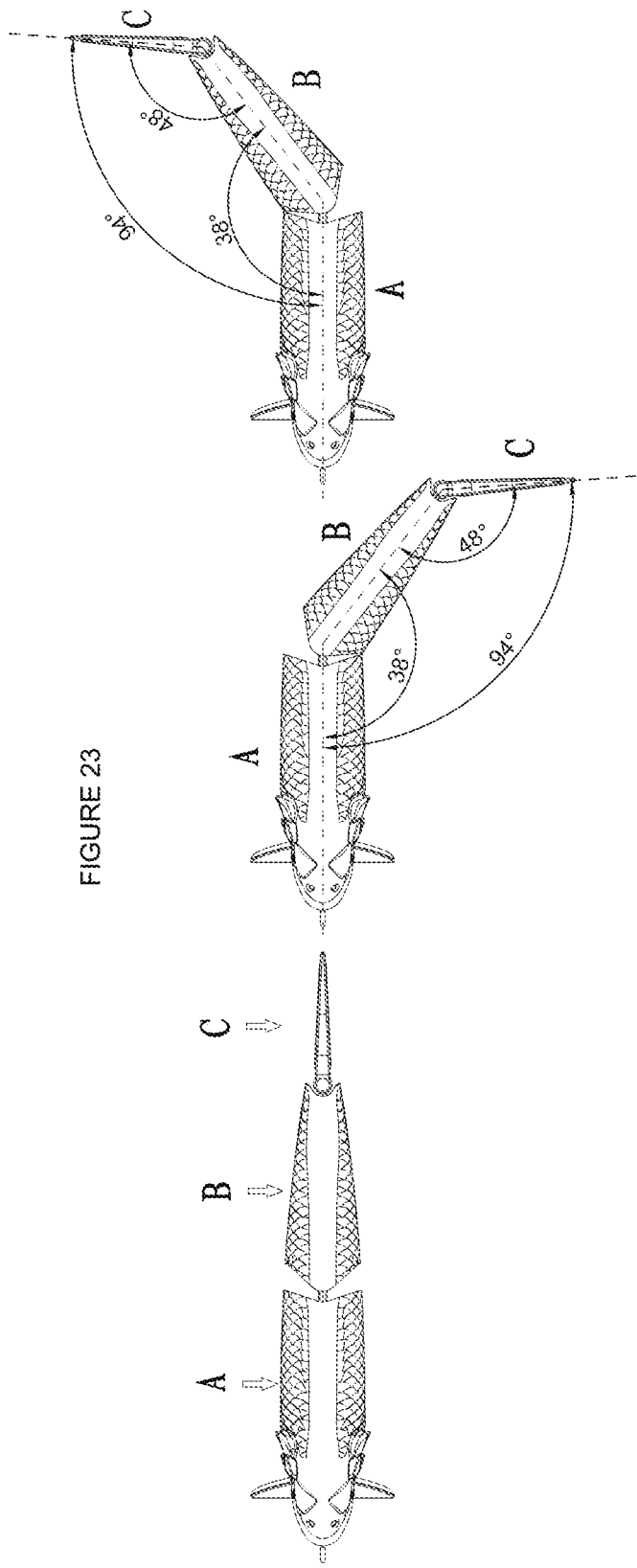
FIG. 23 is a simplified diagram illustrating a swimming motion of the device according to an example.
Figure 24:
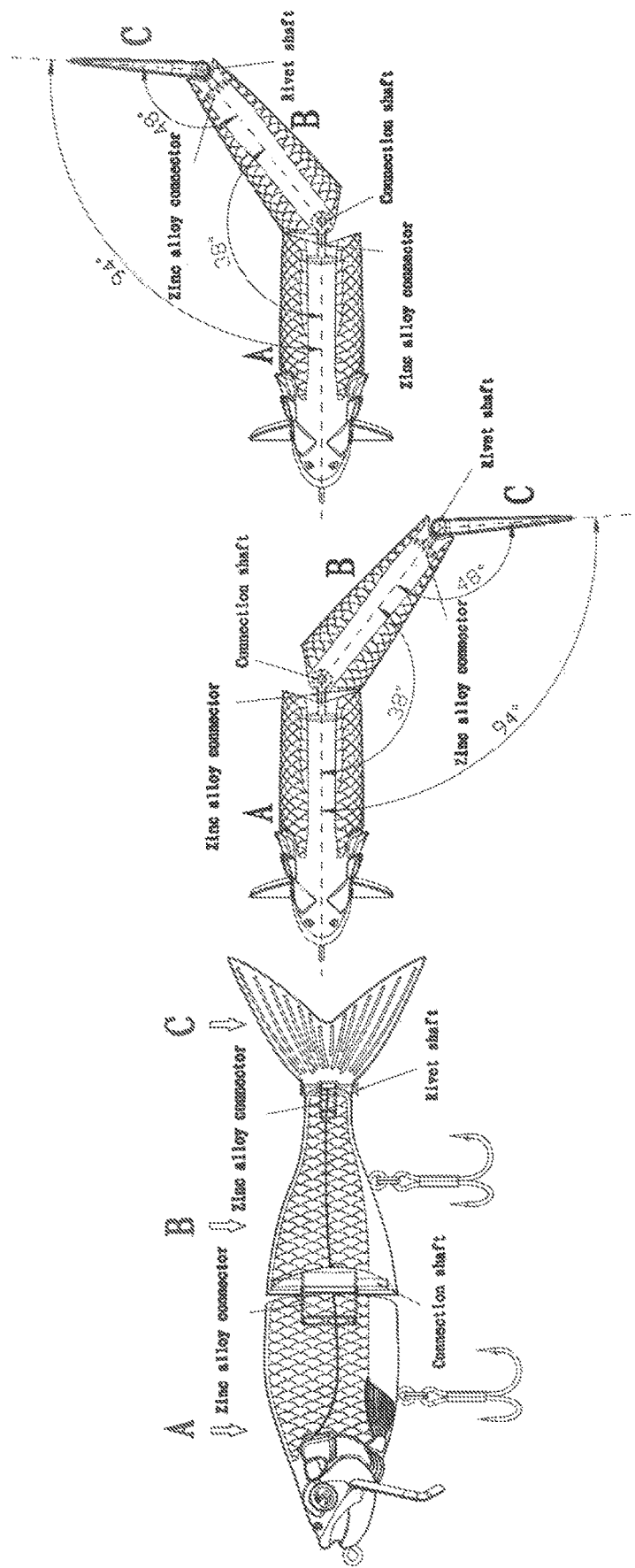
FIG. 24 is a simplified diagram illustrating a swimming motion of the device according to an example.

In an example, the tail section comprises a tail barrel joint coupled between a tail member and a mid-tail section such that the tail member pivots about the tail barrel joint to imitate a tail fluttering action as the device is pulled through the fluid, the tail section being configured with the tail member such that tail member (See, for example, "C" in the Figures below) moves about an angle of 48 degrees in a negative and positive angular direction from a middle point of the tail barrel joint or centerline. The angle can also be slightly more or less depending upon the example. In an example, the tail member hits a portion of the tail member to cause an acoustic sound, which would be in concert with the clacking sound. The tail member has a lower magnitude in volume or mechanical action than the clacking sound. Further details of the swimming motion can be found throughout the present specification and more particularly below. FIG. 22 is a simplified diagram illustrating a swimming motion of the device according to an example. FIG. 23 is a simplified diagram illustrating a swimming motion of the device according to an example. FIG. 24 is a simplified diagram illustrating a swimming motion of the device according to an example. In an example, the device is a "wake bait" and swims slightly below a surface or the water or within a vicinity of the surface of the water to form a wake while swimming. Alternatively, the device can be a sinking bait, which is subsurface at a predetermined depth.

It is also understood that the examples and embodiments described herein are for illustrative purposes only and that various modifications or changes in light thereof will be suggested to persons skilled in the art and are to be included within the spirit and purview of this application and scope of the appended claims. As an example, the method and device can be applied to other types of fishing lures such as minnows, snakes, mice, ducks, and others. Of course, there can be other variations, modifications, and alternatives.

The invention claimed is:

1. A swimbait fishing lure device, consisting of:
    a two-piece device including:
        a head section extending from a first center region within a middle region of the fishing lure device, the first center region having a first internal region including a first slot on a first side and a second slot on a second side of the first internal region; and a tail section extending to a second center region within the middle region of the fishing lure device, the second center region configured with a pin having a first end and a second end, the first end and the second end coupled to a second internal region of the second center region and the pin aligned normal to a direction of a length of the tail section, while attached by the first end and the second end;

a barrel hinge configured between the first center region and the second center region, the barrel hinge comprising;

a metal member having a metal thickness, a metal width, and a metal length, the metal length having a first end and a second end;

a pair of fins, each extending outwardly on the first end, the pair of fins comprising a first fin engaged with the first slot and the second fin engaged with the second slot to attach the head section; and a barrel structure configured with the pin to attach the tail section and configured to allow the tail section to pivot about the pin and cause the tail section to move relative to the head section to imitate a swimming action; and wherein the head section comprises a first head section side and a second head section side coupled together to form the head section as a first single structure; wherein the tail section comprises a first tail section side and a second tail section side coupled together to form the tail section as a second single structure;

wherein the first center region comprises an exterior cavity region configured in a first angle and the second center region comprises an exterior apex region configured in a second angle, the second angle being less than the first angle to allow the tail section to pivot about the pin and swing in a first direction until a first portion of the exterior apex region hits a first portion of the exterior cavity region such that the hit causes a first clacking sound and then swing in a second direction until a second portion of the exterior apex region hits a second portion of the exterior cavity region such that the hits causes a second clacking sound when the lure device is pulled through a fluid; and further comprising a spatial gap between the exterior apex region and an inflection region of the exterior cavity region that is maintained between all angles between the tail section and the head section;

wherein each of the head section and the tail section are made of the polymeric material having a density sufficient to allow the head section and the tail section to sink and suspend in the fluid;

wherein the swimming action causes a plurality of clacking sounds as the tail section pivots about the head section; and wherein the clacking sounds can be heard from a user of the lure device and can be felt from a fishing rod, when pulling the fishing lure device through the water.

2. The device of claim 1 wherein the pin is made of a metal material having sufficient strength to hold the tail section to the head section.

3. The device of claim 1 wherein each fin is normal a plane of the metal length, and each fin is normal to the direction of the length of the tail section.

4. The device of claim 1 wherein the metal member is a single piece of metal material.

5. The device of claim 1 wherein the metal member is configured from a pair of metal sides coupled together to form the metal member.

6. A swimbait fishing lure device, consisting of a two piece device, the two piece device comprising:

a head section extending from a first center region, the first center region having a first internal region including a first slot on a first side and a second slot on a second side of the first internal region;

a tail section extending to a second center region, the second center region configured with a pin having a first end and a second end, the first end and the second end coupled to a second internal region of the second center region and the pin aligned normal to a direction of a length of the tail section, while attached by the first end and the second end;

a barrel hinge configured between the first center region and the second center region, the barrel hinge comprising;

a metal member having a metal thickness, a metal width, and a metal length, the metal length having a first end and a second end;

a pair of fins, each extending outwardly on the first end, the pair of fins comprising a first fin engaged with the first slot and the second fin engaged with the second slot to attach the head section; and a barrel structure configured with the pin to attach the tail section and configured to allow the tail section to pivot about the pin and cause the tail section to move relative to the head section to imitate a swimming action; and wherein the first center region comprises an exterior cavity region configured in a first angle and the second center region comprises an exterior apex region configured in a second angle, the second angle being less than the first angle to allow the tail section to pivot about the pin and swing in a first direction up to an angle of 38 degrees about a center line until a first portion of the exterior apex region hits a first portion of the exterior cavity region such that the hit causes a first clacking sound and then swing in a second direction up to an angle of 38 degrees about the center line until a second portion of the exterior apex region hits a second portion of the exterior cavity region such that the hits causes a second clacking sound when the lure device is pulled through a fluid; and wherein the first clacking sound and the second clacking sound can be heard from a user of the lure device and can be felt from a fishing rod, when pulling the fishing lure device through the water; and wherein each of the head section and the tail section are made of a polymeric material having a density sufficient to allow the head section and the tail section to sink and suspend in a fluid.

7. The device of claim 6 wherein the head section comprises a first head section side and a second head section side coupled together to form the head section as a first single structure; wherein the tail section comprises a first tail section side and a second tail section side coupled together to form the tail section as a second single structure.

8. The device of claim 6 wherein the tail section comprises a tail barrel joint coupled between a tail member and a mid-tail section such that the tail member pivots about the tail barrel joint to imitate a tail fluttering action as the device is pulled through the fluid, the tail section being configured with the tail member such that tail member moves about an angle of 48 degrees in a negative and positive angular direction from a middle point of the tail barrel joint.

9. The device of claim 6 wherein the pin is made of a metal material having sufficient strength to hold the tail section to the head section.

10. The device of claim 6 wherein each fin is normal a plane of the metal length, and each fin is normal to the direction of the length of the tail section.

11. The device of claim 6 wherein the metal member is a single piece of metal material.

12. The device of claim 6 wherein the metal member is configured from a pair of metal sides coupled together to form the metal member.

* * * * *